(12) United States Patent
Yao

(10) Patent No.: US 7,160,403 B2
(45) Date of Patent: Jan. 9, 2007

(54) TREATMENT SYSTEM AND METHOD FOR A HEAD GIMBAL ASSEMBLY STATIC ALTITUDE CONTROL

(75) Inventor: Ming Gao Yao, Dongguan (CN)

(73) Assignee: SAE Magnetics (H.K.) Ltd., Shatin (HK)

( * ) Notice: Subject to any disclaimer, the term of this patent is extended or adjusted under 35 U.S.C. 154(b) by 0 days.

(21) Appl. No.: 11/102,122

(22) Filed: Apr. 8, 2005

(65) Prior Publication Data

US 2005/0173043 A1 Aug. 11, 2005

Related U.S. Application Data

(62) Division of application No. 10/817,568, filed on Apr. 1, 2004.

(30) Foreign Application Priority Data

Sep. 25, 2003 (WO) .................... PCT/CN03/00815

(51) Int. Cl.
*B32B 37/12* (2006.01)
*B32B 41/00* (2006.01)

(52) U.S. Cl. .................. 156/64; 156/297; 156/299

(58) Field of Classification Search ............... 156/64, 156/293, 297, 298, 299, 358, 359, 379, 379.9, 156/556, 559, 560; 29/833, 834, 836, 837, 29/737, 739

See application file for complete search history.

(56) References Cited

U.S. PATENT DOCUMENTS

| | | | |
|---|---|---|---|
| 5,473,488 A | 12/1995 | Gustafson et al. | 360/104 |
| 6,284,073 B1 * | 9/2001 | Nemoto et al. | 156/64 |
| 6,466,257 B1 | 10/2002 | Baugh et al. | 348/95 |
| 6,640,423 B1 * | 11/2003 | Johnson et al. | 29/740 |
| 2002/0029461 A1 * | 3/2002 | Kamigama et al. | 29/603.06 |
| 2002/0135926 A1 | 9/2002 | Girard et al. | 360/75 |
| 2005/0165561 A1 * | 7/2005 | Zeng | 702/41 |

FOREIGN PATENT DOCUMENTS

| | | |
|---|---|---|
| JP | 2002074871 A2 | 3/2002 |
| JP | 2002133808 A2 | 5/2002 |
| WO | WO 96/10820 | 4/1996 |
| WO | WO 02/091365 | 11/2002 |

* cited by examiner

*Primary Examiner*—George Koch
(74) *Attorney, Agent, or Firm*—Kenyon & Kenyon LLP

(57) ABSTRACT

A system and method to control the head suspension assembly static attitude during the manufacturing process are disclosed. A loading fixture loads and supports a head suspension while a slider is attached. A pitch static attitude and roll static attitude (PSA/RSA) monitor takes a first measurement of the pitch static attitude and roll static attitude of the head suspension. A rotatable positioning tool holds the slider in a position relative to the head suspension for attachment and to adjust the position of the slider in response to the first measurement.

4 Claims, 12 Drawing Sheets

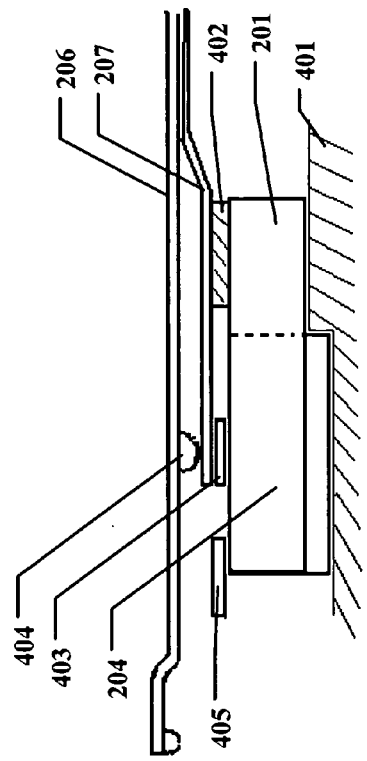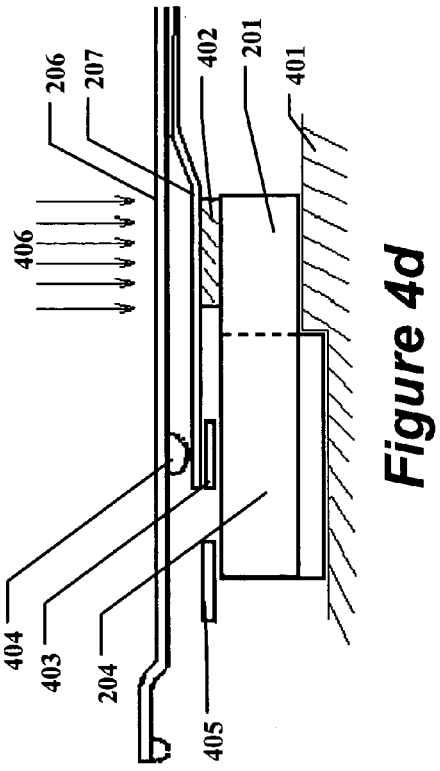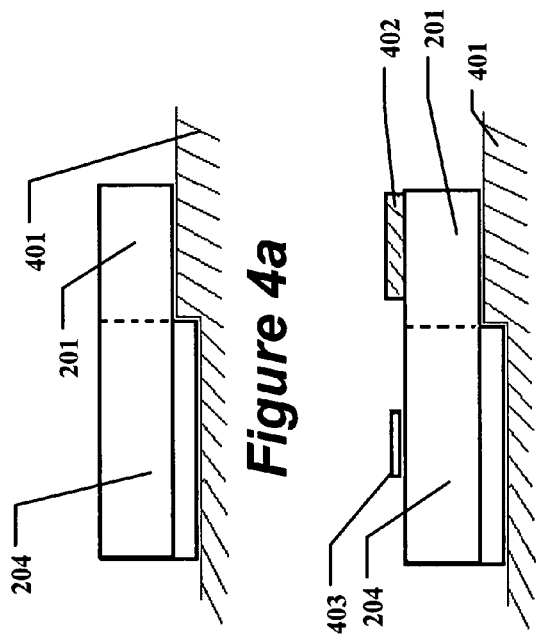

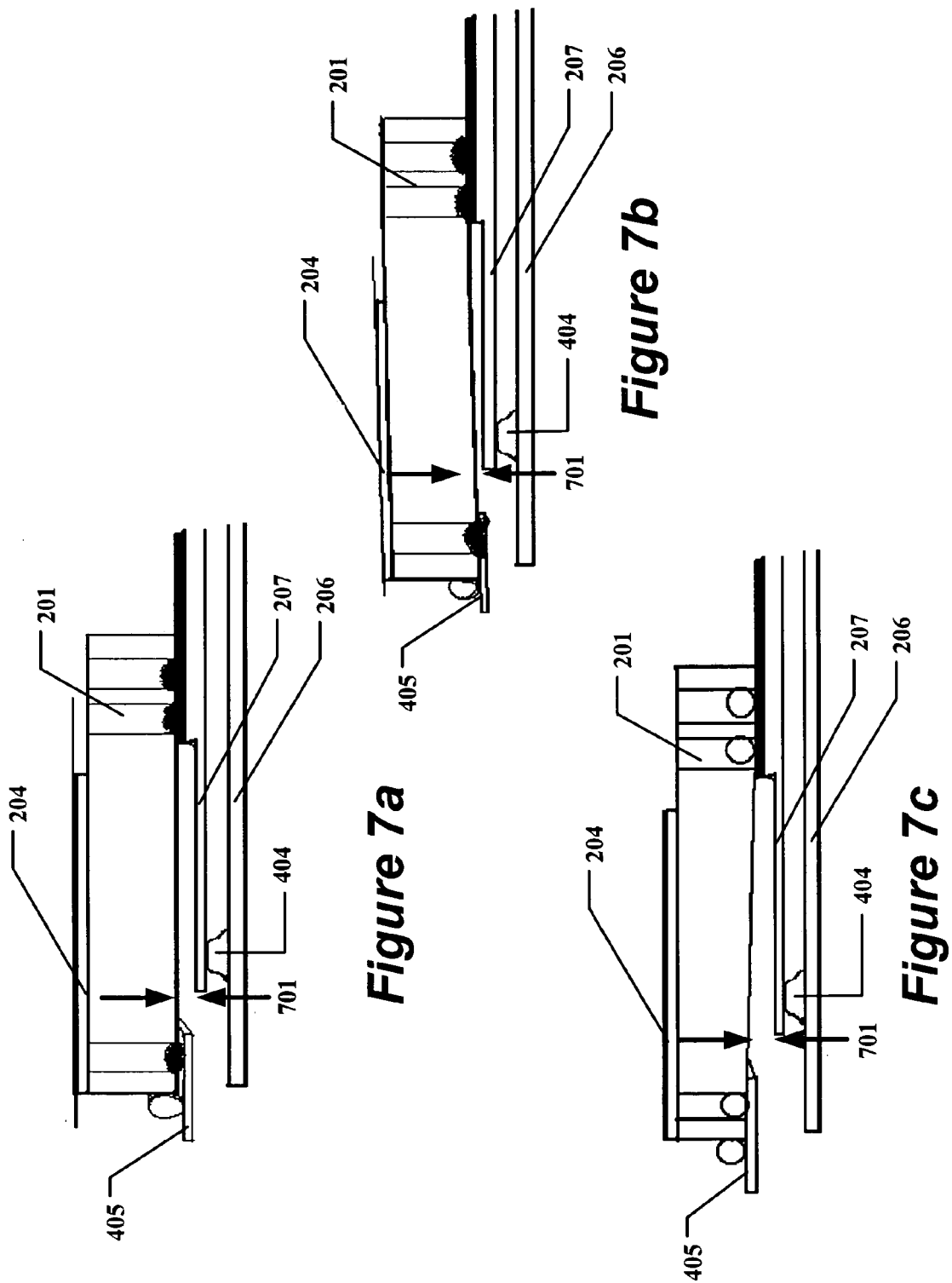

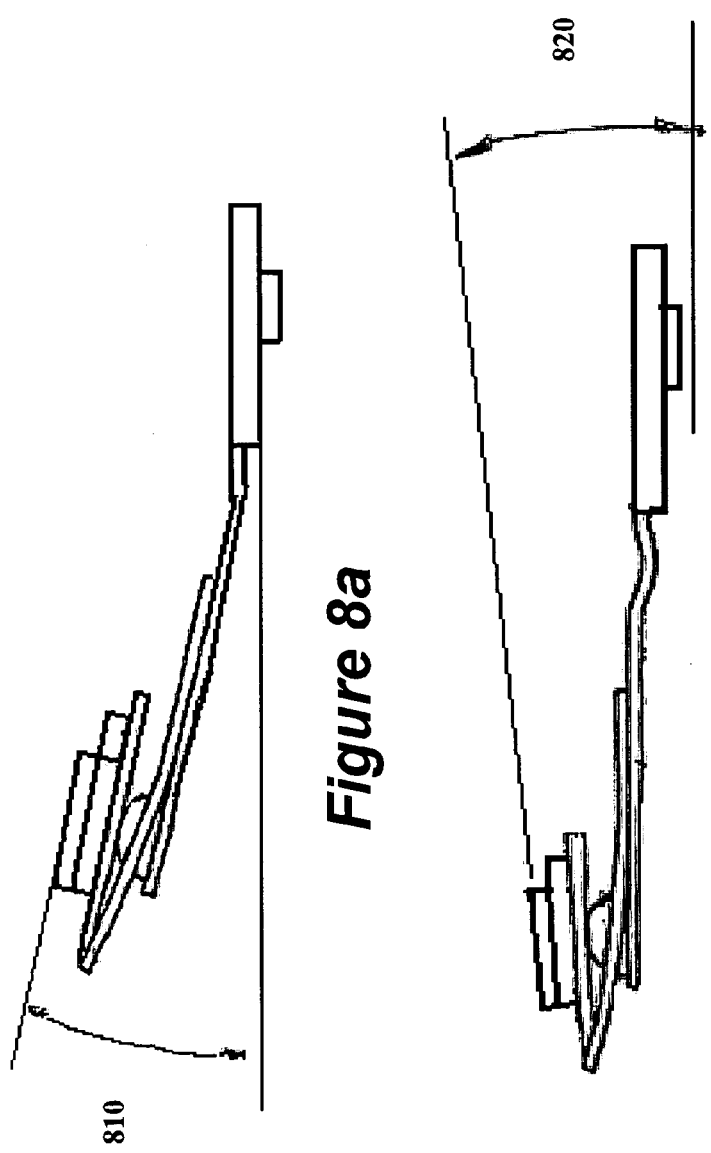
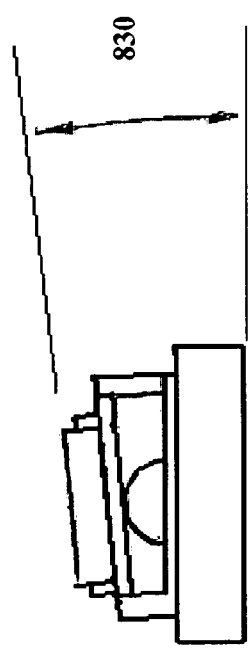
Figure 8a
Figure 8b
Figure 8c

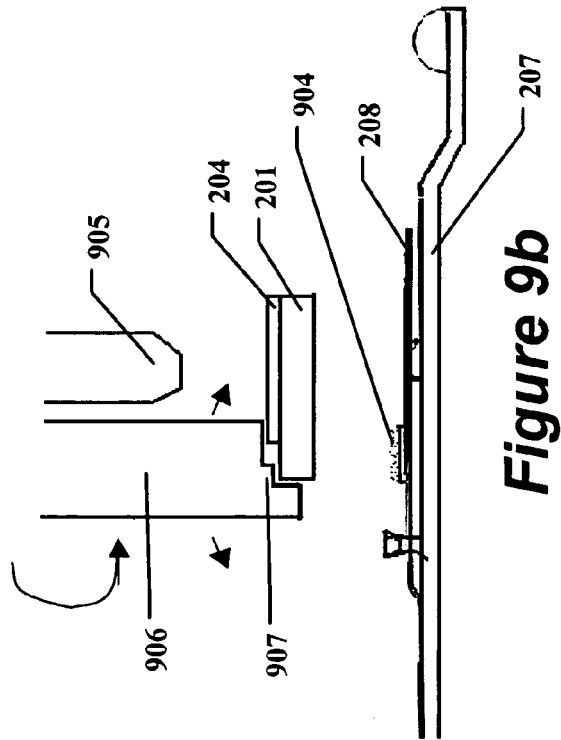
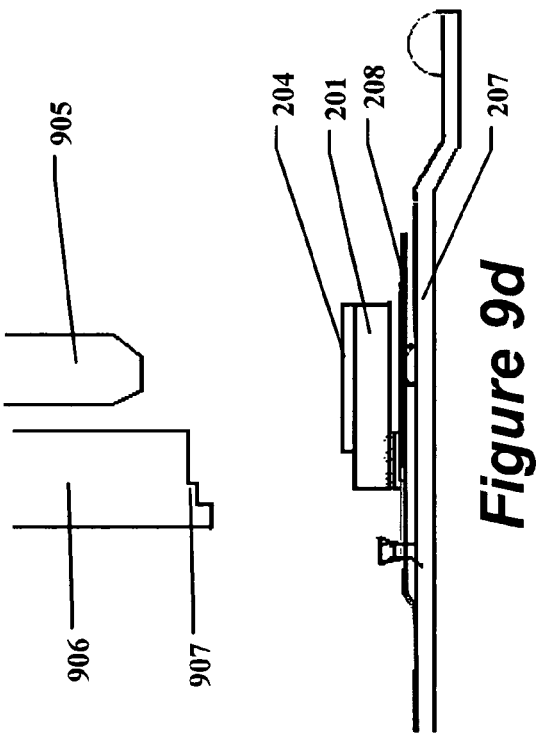
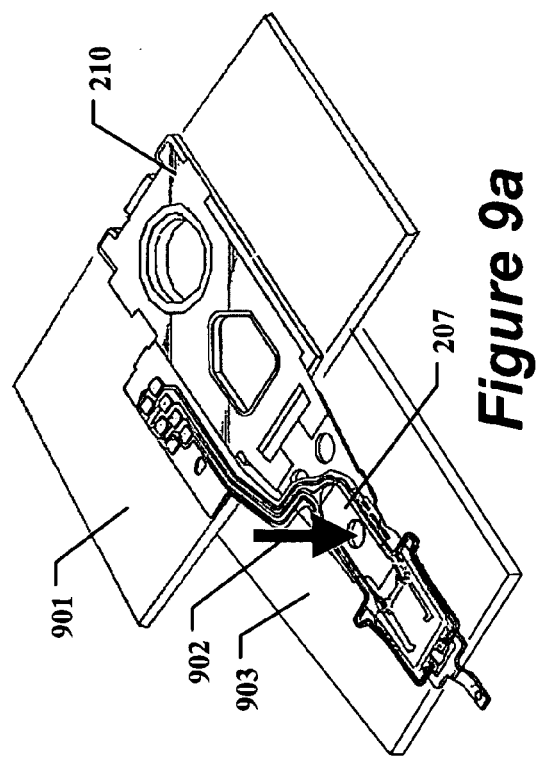
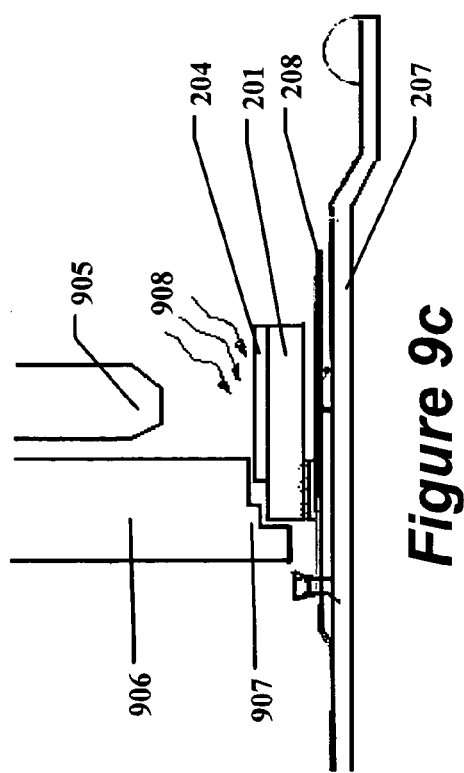
Figure 9a
Figure 9b
Figure 9c
Figure 9d

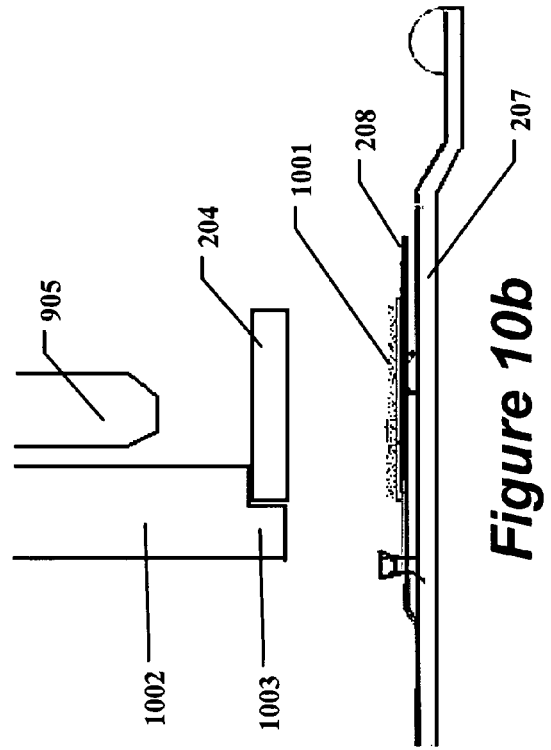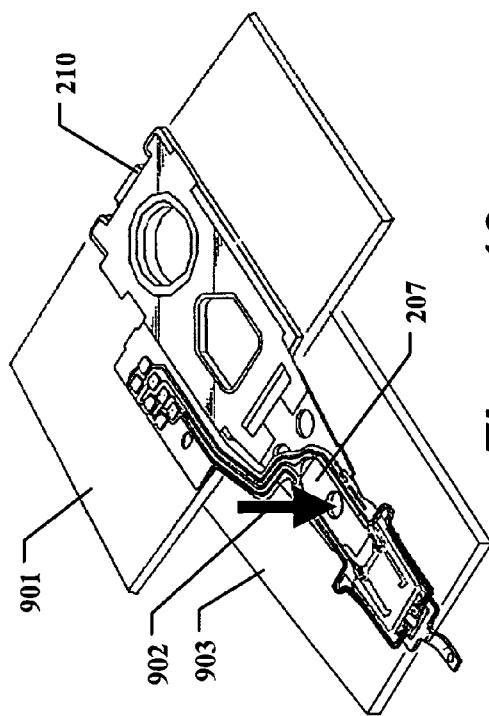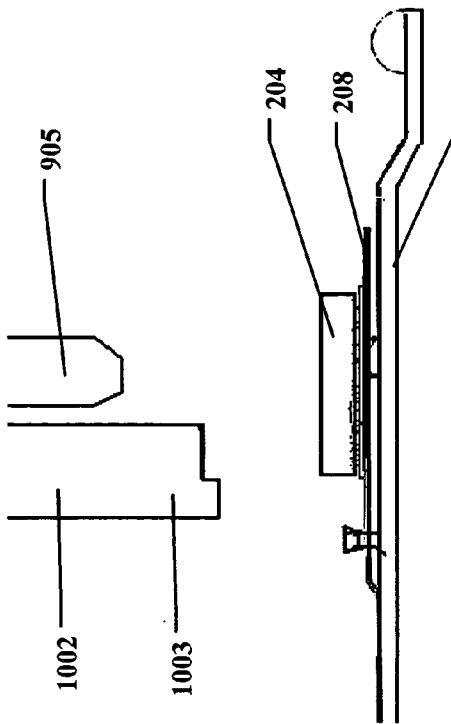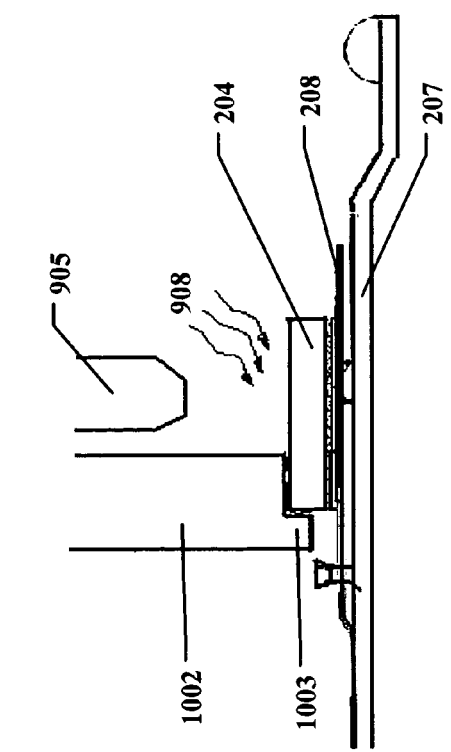

TREATMENT SYSTEM AND METHOD FOR A HEAD GIMBAL ASSEMBLY STATIC ALTITUDE CONTROL

RELATED APPLICATION

This application is a Divisional of patent application Ser. No. 10/817,568, filed on Apr. 1, 2004, which claims priority to PCT/CN03/00815, filed on 25 Sep. 2003 (25.09.03).

BACKGROUND INFORMATION

The present invention is directed to attaching a slider to a head suspension. More specifically, the present invention pertains to controlling roll static attitude and pitch static attitude during the attachment process.

FIG. 1 illustrates a hard disk drive design typical in the art. Hard disk drives 100 are common information storage devices consisting essentially of a series of rotatable disks 104 that are accessed by magnetic reading and writing elements. These data transferring elements, commonly known as transducers, are typically carried by and embedded in a slider body 110 that is held in a close relative position over discrete data tracks formed on a disk to permit a read or write operation to be carried out. In order to properly position the transducer with respect to the disk surface, an air bearing surface (ABS) formed on the slider body 110 experiences a fluid air flow that provides sufficient lift force to "fly" the slider 110 (and transducer) above the disk data tracks. The high speed rotation of a magnetic disk 104 generates a stream of air flow or wind along its surface in a direction substantially parallel to the tangential velocity of the disk. The air flow cooperates with the ABS of the slider body 110 which enables the slider to fly above the spinning disk. In effect, the suspended slider 110 is physically separated from the disk surface 104 through this self-actuating air bearing. The ABS of a slider 110 is generally configured on the slider surface facing the rotating disk 104 (see below), and greatly influences its ability to fly over the disk under various conditions.

FIG. 2a illustrates a micro-actuator with a U-shaped ceramic frame configuration 201. The frame 201 is made of, for example, Zirconia. The frame 201 has two arms 202 opposite a base 203. A slider 204 is held by the two arms 202 at the end opposite the base 203. A strip of piezoelectric material 205 is attached to each arm 202. A bonding pad 206 allows the slider 204 to be electronically connected to a controller. FIG. 2b illustrates the micro-actuator as attached to an actuator suspension 207. The micro-actuator can be coupled to a suspension fixture 208. Traces 209, coupled along the suspension 207, apply a voltage to the strips of piezoelectric material 205. These voltages cause the strips 205 to contract and expand, moving the placement of the slider 204. The suspension 207 can be attached to a base plate 210 with a hole 211 for mounting on a pivot. A tooling hole 212 facilitates handling of the suspension during manufacture.

FIG. 3 illustrates a prior art method for coupling a slider 204 to a micro-actuator 201. Two drops of epoxy or adhesive 302 are added to both sides of the slider 202. The slider 202 may then be inserted into the U-shaped micro-actuator. The back surfaces of the slider 202 and the micro-actuator 201 are kept at the same height throughout the curing process.

FIGS. 4a–e illustrate a prior art method for coupling the slider 204 and micro-actuator 201 to the head suspension 207. As shown in FIG. 4a, the micro-actuator 201 and the slider 204 are placed on a fixture 401. As shown in FIG. 4b, an epoxy 402 is applied to the base of the micro-actuator 201. A thin shim 403 is placed on top of the micro-actuator 201 and the slider 204. As shown in FIG. 4c, a suspension fixture 208 of the head suspension is placed atop the thin shim 403 and the epoxy 402. A dimple 404 keeps the suspension fixture 208 a parallel distance from the head suspension 207. A connection plate 405 is added to the slider. As shown in FIG. 4d, an ultraviolet laser 406 is used to cure the epoxy 402. FIG. 4e shows the assembled head suspension 207, micro-actuator 201, and slider 204.

FIG. 5 illustrates in a flowchart an alternate prior art method for coupling the slider 204 and micro-actuator 201 to the head suspension 207. The process starts (Step 510) by loading the suspension 207 onto a loading fixture to keep the suspension in a free condition (Step 520). The location for potting the micro-actuator 201 and the slider 204 is detected by using the center of the pivot hole 211 and the center of the tooling hole 212 as a y-axis and the gold ball bonding pad 206 as the datum (Step 530). The potting epoxy is added to the suspension fixture 208 (Step 540). The slider 204 and the micro-actuator 201 are placed upon the suspension fixture 208 (Step 550). The epoxy is cured by ultraviolet curing (Step 560). The combined suspension 207, micro-actuator 201, and slider 204 are unloaded from the loading fixture (Step 570), ending the process (Step 580).

In the current hard disk drive industry, the pitch static attitude (PSA) and the roll static attitude (RSA) are very important and critical parameters for head flying stability. The ability of the magnetic head to read from and write to the magnetic disk will be affected if the flying is not stable. Large variations in the head flying ability could lead to an undesirable disk crash. This leads to head damage, further negatively affecting disk drive reliability.

BRIEF DESCRIPTION OF THE DRAWINGS

FIGS. 4a–e illustrate a prior art method for coupling the slider and micro-actuator to the head suspension.

FIG. 7 illustrates a slider gap problem cured by embodiments of the present invention.

FIGS. 8a–c illustrate a definition of the pitch static attitude (PSA) and the roll static attitude (RSA).

FIGS. 9a–d illustrate one embodiment of a loading fixture used to mount the slider and micro-actuator to the suspension according to the present invention.

FIGS. 10a–d illustrate one embodiment of a loading fixture used to mount the slider to the suspension according to the present invention.

DETAILED DESCRIPTION

A system and method to control the head suspension assembly static attitude during the manufacturing process are disclosed. In embodiments of the present invention, a loading fixture loads and supports a head suspension while a slider is attached. A pitch static attitude and roll static attitude (PSA/RSA) monitor may take a first measurement of the pitch static attitude and roll static attitude of the head suspension. A rotatable positioning tool may hold the slider in a position relative to the head suspension for attachment and to adjust the position of the slider in response to the first measurement.

Figure 1:
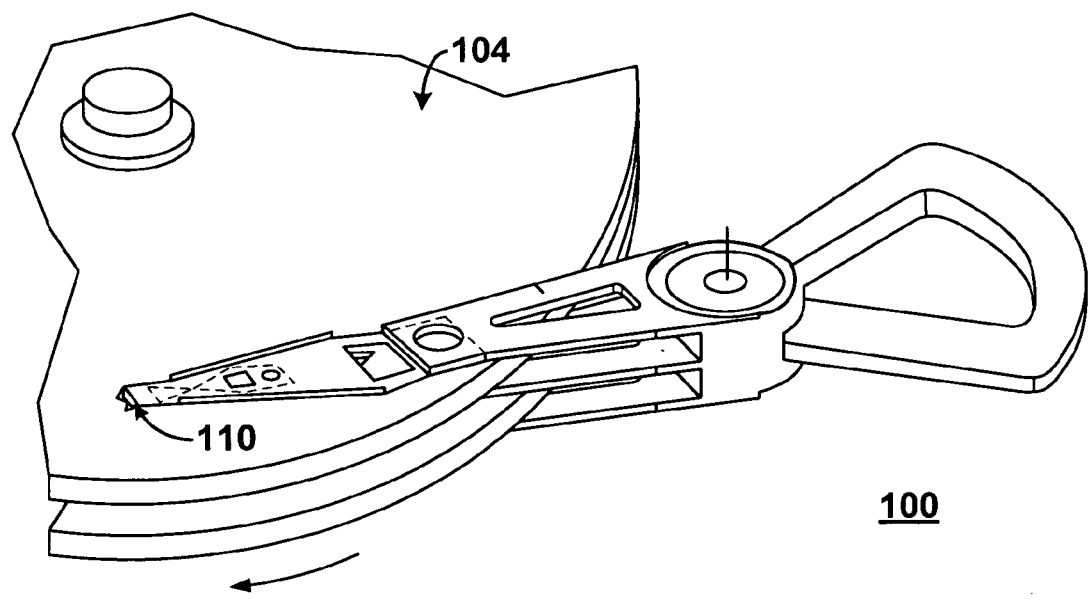
FIG. 1 illustrates a hard disk drive design typical in the art.
Figures 2A, 2B:
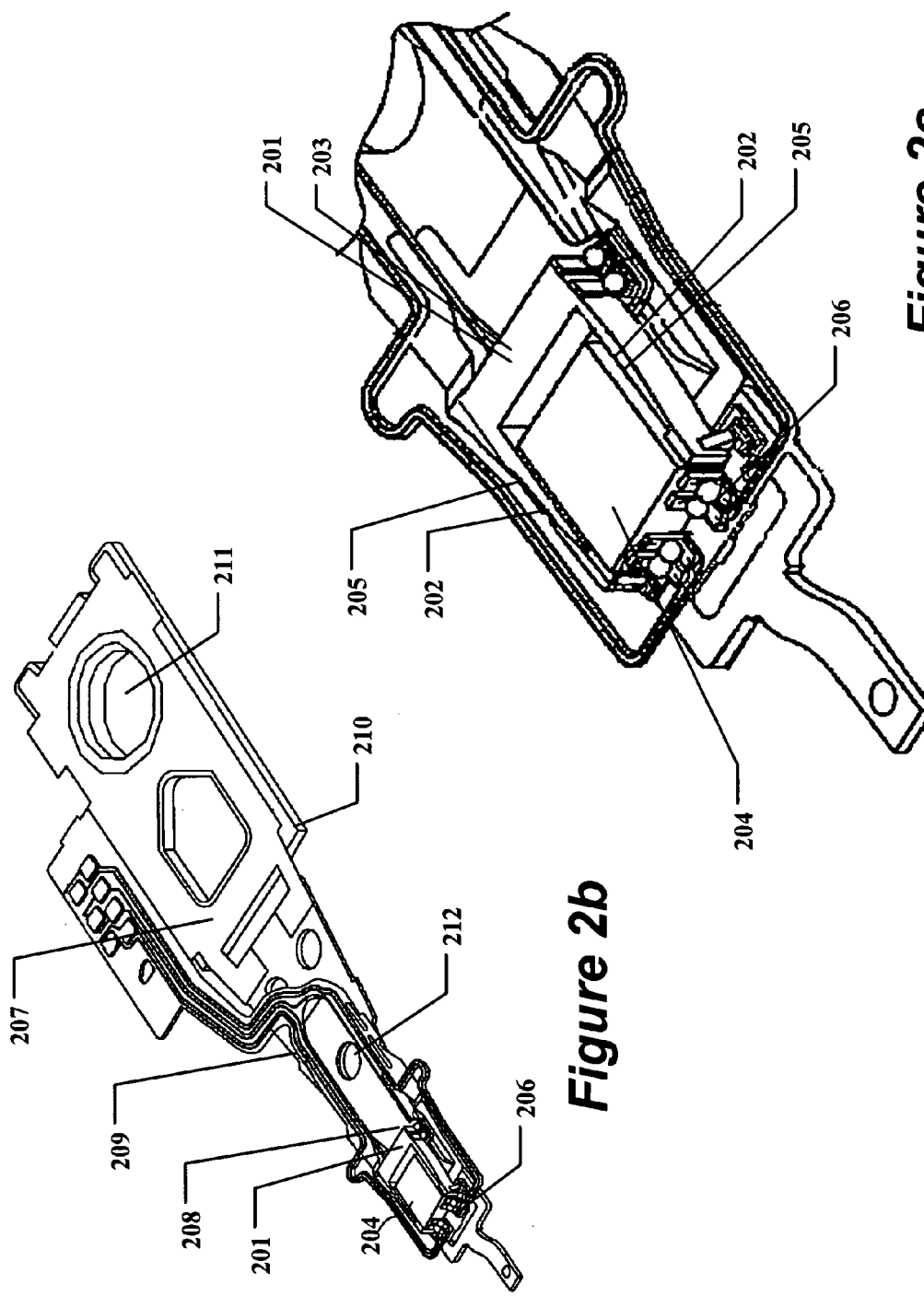
FIG. 2 illustrates a typical head gimbal assembly having a U-shaped micro-actuator.
Figure 3:
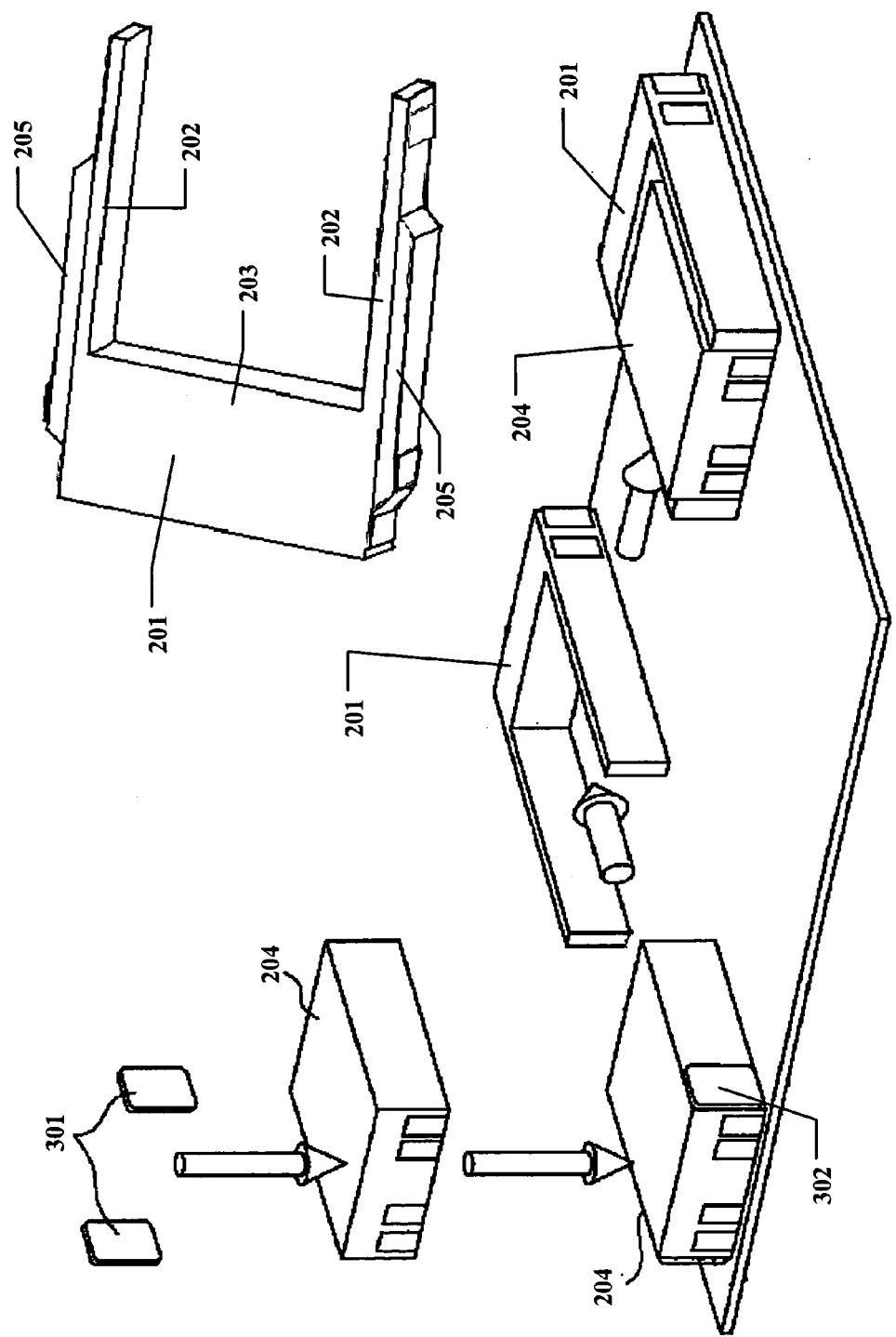
FIG. 3 illustrates a prior art method for coupling a slider to a micro-actuator.
Figure 5:
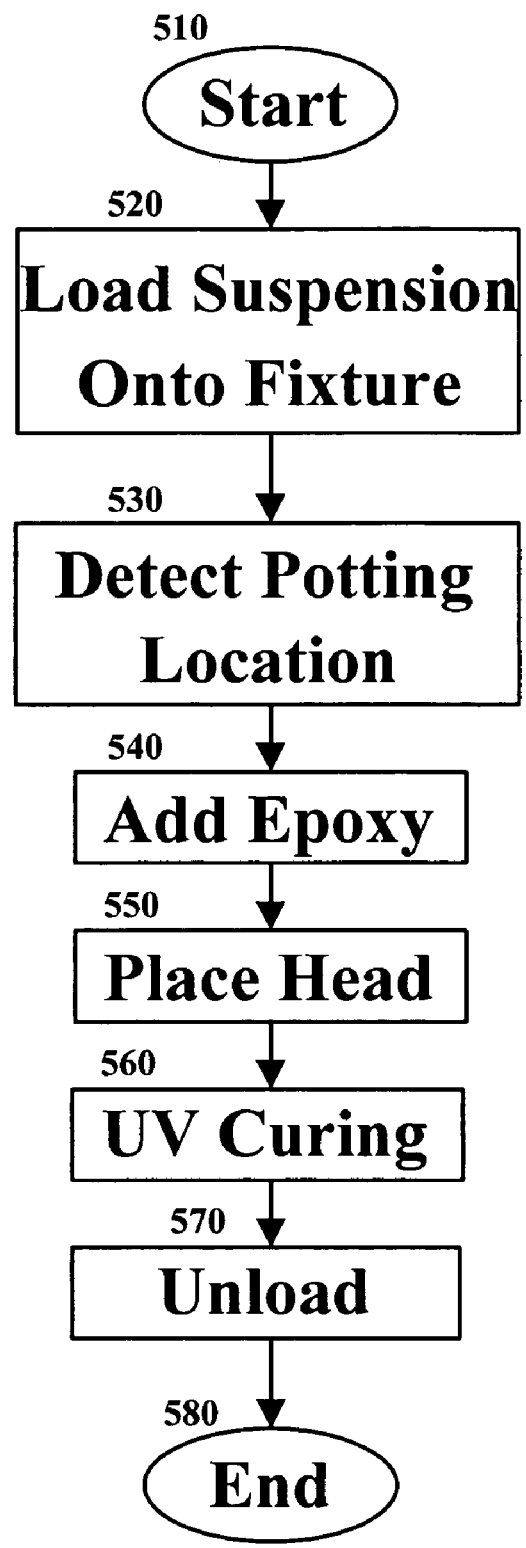
FIG. 5 illustrates in a flowchart an alternate prior art method for coupling the slider and micro-actuator to the head suspension.
Figure 6B:
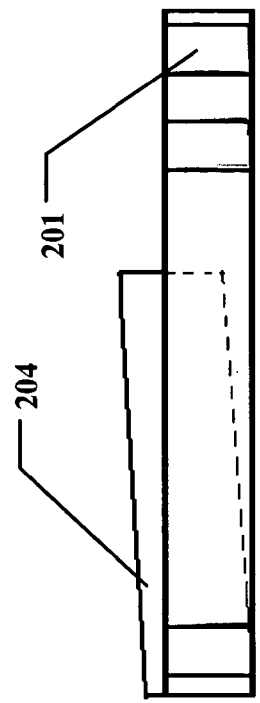
FIG. 6 illustrates a slider tilt problem cured by embodiments of the present invention.
Figure 6C:
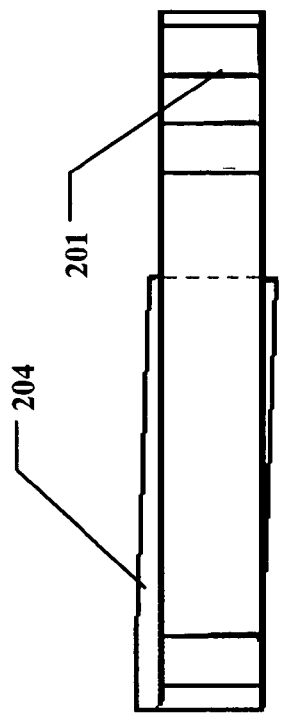
Figure 6A:
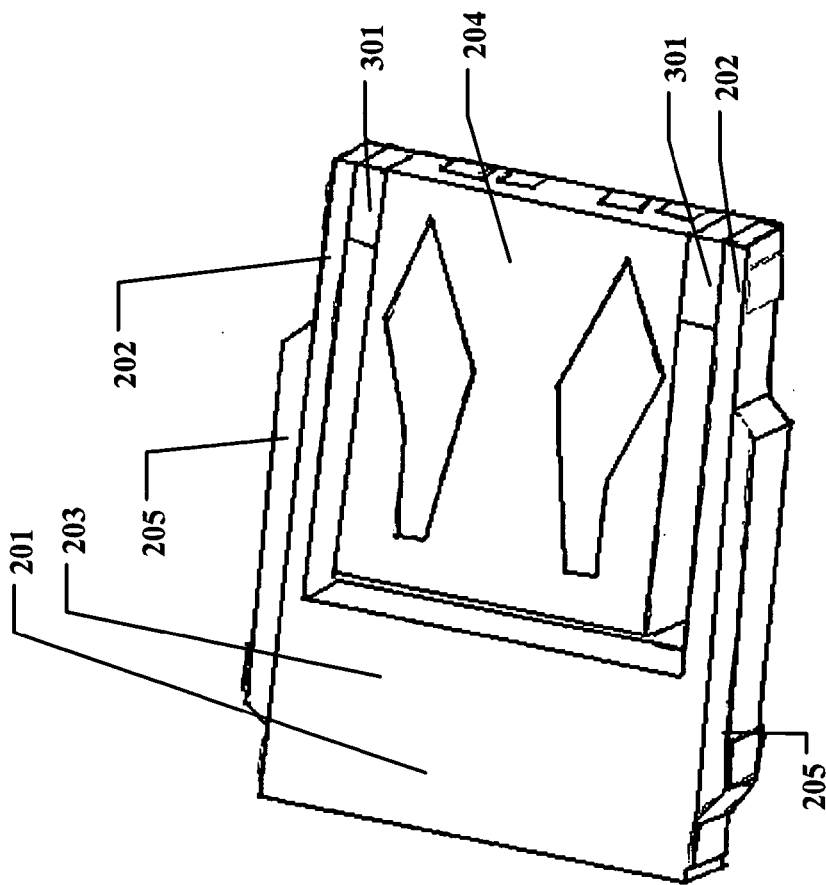

FIGS. 6*a*–*c* and 7*a*–*c* illustrate the slider tilt problem. FIG. 6*a* shows a micro-actuator 201 coupled to a slider 204 by an epoxy 301. The slider may tilt upwards, as shown in FIG. 6*b*, or downwards, as shown in FIG. 6*c*, during the insert process due to manufacture tolerance and variation. As shown in FIG. 7*a*, a proper parallel gap 701 is needed between the suspension fixture 208 and the slider 201 in order to keep a precise position adjustment stability of the micro-actuator. Due to the softness of the materials such as the epoxy or adhesive, pressure during the mounting process may make it difficult to keep the gap parallel. Epoxy "creeping" during the curing process may cause the head micro-actuator assembly to tilt as well. The slider may tilt upwards, as shown in FIG. 7*b*, or downwards, as shown in FIG. 7*c*, affecting the HGA static attitude.

FIGS. 8*a*–*c* illustrate a definition of the pitch static attitude (PSA) and the roll static attitude (RSA). PSA is the angle formed between the slider and the suspension in the direction parallel to the axis of symmetry of the suspension when no air bearing is formed. FIG. 8*a* shows a negative PSA 810 and FIG. 8*b* shows a positive PSA 820. RSA is the angle formed between the slider and the suspension in the direction perpendicular to the suspension axis of symmetry. FIG. 8*c* shows an example of RSA 830.

FIGS. 9*a*–*d* illustrate one embodiment of the present invention of a loading fixture used to mount the slider and micro-actuator to the suspension. As shown in the embodiment of FIG. 9*a*, a base plate 210 and suspension 207 are placed upon a loading fixture 901. A spring pin 902 is applied to the suspension 207 to keep the suspension at the proper height. A suspension support 903 is attached to the loading fixture 901 to support the suspension 207.

As shown in FIG. 9*b*, epoxy or another adhesive 904 is added to the suspension fixture 208 to couple the suspension fixture 208 to the micro-actuator 201. The epoxy 904 or adhesive can be applied, for example, using a dispenser. A laser measurement system 905 monitors the PSA/RSA of the suspension 207 during the bonding process. In this example, the base plate 210 is used as the reference point for the laser measurement system. A vacuum nozzle 906 positions the slider 204 and micro-actuator 201 to be bonded to the suspension fixture 208. The vacuum nozzle 906 may have a step 907 to maintain the position of the slider and the micro-actuator frame and help maintain a proper gap between the slider 204 and the suspension fixture 208. A camera system (not shown) can be used to monitor the gap size and make sure that the slider 204 and the suspension fixture 208 are parallel. The vacuum nozzle 906 moves laterally or vertically, as well as rotates up to thirty degrees along an axis normal to the suspension in this embodiment.

As shown in FIG. 9*c*, the vacuum nozzle 906 may move the micro-actuator 201 to be in contact with the suspension fixture 208. The laser measurement system 905 continues to measure the PSA and RSA of the suspension as the micro-actuator 201 is bonded to the suspension fixture 208. In this embodiment, the RSA and PSA of previous head suspension assemblies are used as a reference to reduce adjustment time. An ultra violet light 908 is used to cure the mounting epoxy or adhesive 904 by exposing it for 10–30 seconds. As shown in FIG. 9*d*, the vacuum nozzle 906 and spring pin 902 can then be removed and the next head gimbal assembly put in place.

FIGS. 10*a*–*d* illustrate one embodiment of a loading fixture used to mount the slider to the suspension. As shown in FIG. 10*a*, a base plate 210 and suspension 207 are placed upon a loading fixture 901 in this example. A spring pin 902 is applied to the suspension 207 to keep the suspension at the proper height. A suspension support 903 is attached to the loading fixture 901 to support the suspension 207.

As shown in FIG. 10*b*, epoxy or another adhesive 1001 is added to the suspension fixture 208 to couple the suspension fixture 208 to the slider 204. In this example, the epoxy 1001 or adhesive is applied using a dispenser. The laser measurement system 905 monitors the PSA/RSA of the suspension 207 during the bonding process. In this example, the base plate 210 is used as the reference point for the laser measurement system. A vacuum nozzle 1002 positions the slider 204 to be bonded to the suspension fixture 208. The vacuum nozzle 1002 has a step 1003 to hold the slider 204 in the proper position. The vacuum nozzle 1002 moves laterally or vertically, as well as rotates up to thirty degrees along an axis normal to the suspension.

As shown in FIG. 10*c*, the vacuum nozzle 1002 moves the slider 204 to be in contact with the suspension fixture 208. The laser 905 may continue to measure the PSA and RSA of the suspension as the slider 204 is bonded to the suspension fixture 208. The RSA and PSA of previous head suspension assemblies can be used as a reference to reduce adjustment time. In this example, an ultra violet light 908 is used to cure the mounting epoxy or adhesive 1001 by exposing it for 10–30 seconds. As shown in FIG. 10*d*, the vacuum nozzle 1002 and spring pin 902 are then removed and the next head gimbal assembly put in place.

Figure 11:
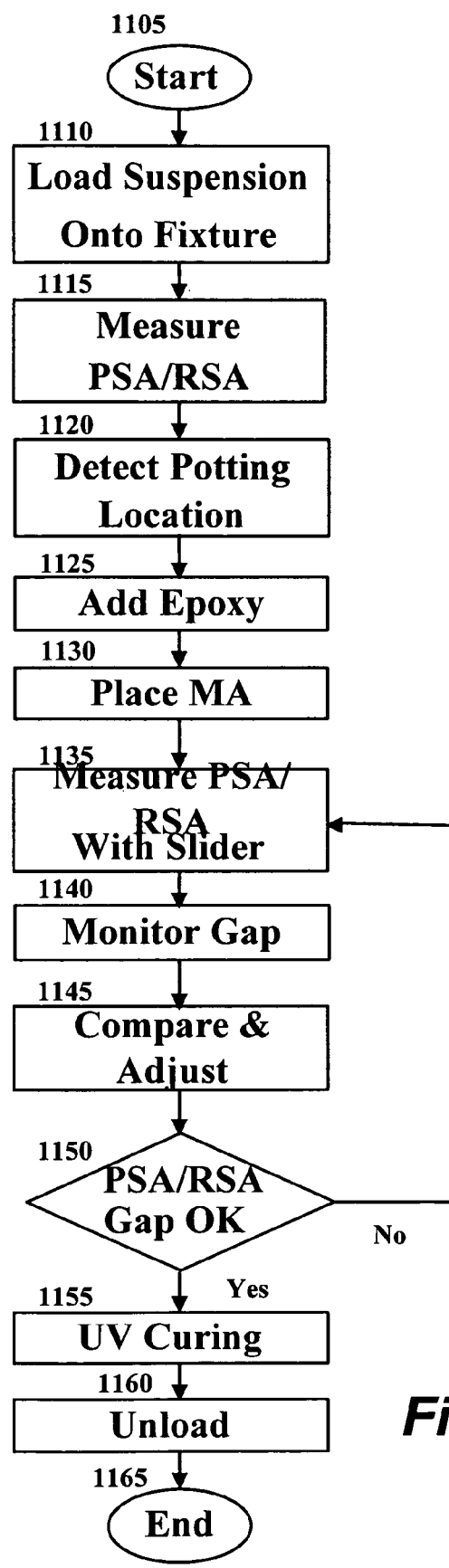
FIG. 11 illustrates, in a flowchart, one embodiment of a process for mounting the slider and micro-actuator to the suspension according to the present invention.

FIG. 11 illustrates, in a flowchart, one embodiment of a process for mounting the slider 204 and micro-actuator 201 to the suspension 207. The process starts (Block 1105) by loading the suspension 207 onto the fixture 901 (Block 1110). The PSA and RSA of the suspension are measured (Block 1115). The potting location on the suspension fixture 208 (Block 1120), and epoxy or another adhesive 904 is added (Block 1125). The slider 204 and micro-actuator 201 are placed on the suspension fixture 208 (Block 1130). The PSA and RSA is measured with the slider 204 and micro-actuator 201 in place (Block 1135) and the slider-suspension fixture gap is monitored (Block 1140). The PSA and RSA are compared to the PSA and RSA of the suspension 208 alone and the appropriate adjustments are made (Block 1145). If the PSA, RSA, and gap are not as desired (Block 1150), the measurement (Block 1135), monitoring (Block 1140), comparison, and adjustment (Block 1145) are repeated. If the PSA, RSA, and gap are as desired (Block 1150), then the adhesive 904 is cured by ultraviolet light 908 for 10-30 seconds (Block 1155). The head gimbal assembly is unloaded (Block 1160) and the process is finished (Block 1165).

Figure 12:
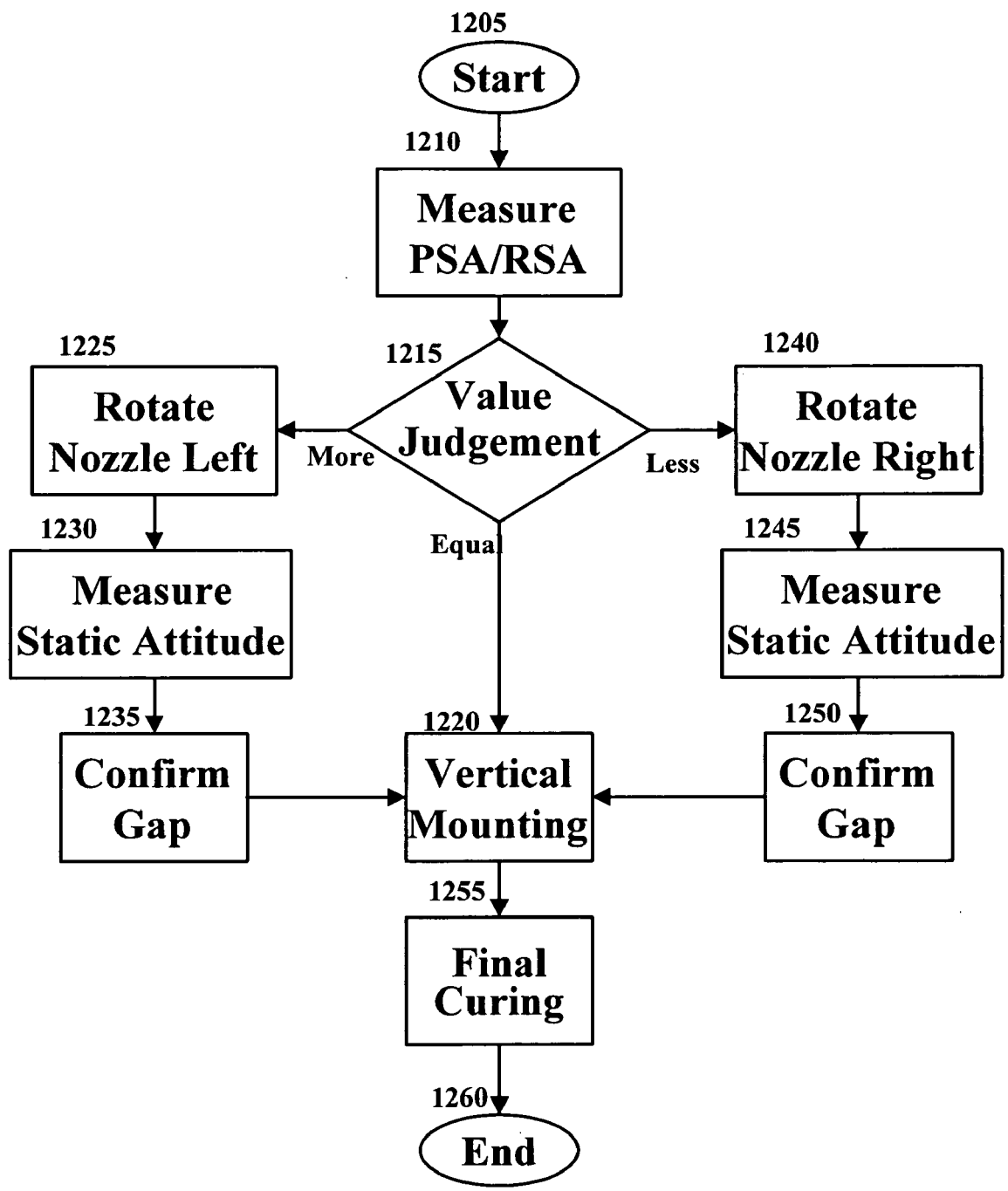
FIG. 12 illustrates, in a flowchart, one embodiment of a process for adjusting the slider and micro-actuator on the suspension according to the present invention.

FIG. 12 illustrates, in a flowchart, one embodiment of a process for adjusting the slider 204 and micro-actuator 201 on the suspension 207. The process starts (Block 1205) by measuring the PSA and RSA of the suspension 207, the slider 204, and in some cases the micro-actuator 201 (Block 1210). If the PSA and RSA are equal to the desired PSA and RSA target range (Block 1215), the vacuum nozzle 906 vertically mounts the slider 204 and the micro-actuator 201 to the suspension fixture 208 (Block 1220). If the PSA and RSA are greater than the desired PSA and RSA target range (Block 1215), the vacuum nozzle 906 is rotated to the left (Block 1225). The static attitude of the air bearing surface of the slider 201 is measured (Block 1230) and the gap between the slider 201 and the suspension fixture 208 is confirmed (Block 1235). The vacuum nozzle 906 vertically mounts the slider 204 and the micro-actuator 201 to the suspension fixture 208 (Block 1220). If the PSA and RSA are less than the desired PSA and RSA target range (Block 1215), the vacuum nozzle 906 is rotated to the right (Block 1240). The static attitude of the air bearing surface of the slider 201 is measured (Block 1245) and the gap between the slider 201 and the suspension fixture 208 is confirmed (Block 1250). The vacuum nozzle 906 vertically mounts the slider 204 and the micro-actuator 201 to the suspension fixture 208 (Block 1220). A final curing on the adhesive bond is performed (Block 1255) and the process is finished (Block 1260).

What is claimed is:

1. A method, comprising:
   supporting a suspension while a micro-actuator with a slider is attached;
   holding the micro-actuator in a position relative to the suspension for attachment;
   applying an adhesive substance on a predetermined position of the suspension for tacking the micro-actuator on the suspension;
   taking a first measurement of the pitch static attitude and roll static attitude of the micro-actuator on the suspension;
   taking a second measurement of a gap between the micro-actuator and the suspension;
   adjusting the position of the micro-actuator in response to the first and second measurements; and
   curing the adhesive substance after adjusting the position of the micro-actuator.

2. The method of claim 1, wherein the first measurement is taken with a laser measurement system.

3. The method of claim 1, wherein the second measurement is taken by a camera system.

4. The method of claim 1, further comprising using a base plate of the suspension as a reference point for measurements.

* * * * *

UNITED STATES PATENT AND TRADEMARK OFFICE
CERTIFICATE OF CORRECTION

PATENT NO. : 7,160,403 B2  Page 1 of 1
APPLICATION NO. : 11/102122
DATED : January 9, 2007
INVENTOR(S) : Ming Gao Yao It is certified that error appears in the above-identified patent and that said Letters Patent is hereby corrected as shown below:

Title Page, Title, Item [54] Line 3 "ALTITUDE" should be --ATTITUDE--
Column 1, Title, Line 3 "ALTITUDE" should be --ATTITUDE--
Column 4, Line 4 "ultra violet" should be --ultraviolet--
Column 4, Line 35 "ultra violet" should be --ultraviolet--
Column 4, Line 46 "208 (Block 1120)" should be --208 is detected (Block 1120--

Signed and Sealed this

Eighth Day of June, 2010

David J. Kappos
*Director of the United States Patent and Trademark Office*